US010746388B2

(12) United States Patent
Workman

(10) Patent No.: US 10,746,388 B2
(45) Date of Patent: Aug. 18, 2020

(54) LIGHT SOURCE WITH INTEGRATED CABLE MANAGEMENT SYSTEM

(71) Applicant: Jasco Products Company LLC, Oklahoma City, OK (US)

(72) Inventor: Rob Workman, Oklahoma City, OK (US)

( * ) Notice: Subject to any disclaimer, the term of this patent is extended or adjusted under 35 U.S.C. 154(b) by 0 days.

(21) Appl. No.: 16/287,369

(22) Filed: Feb. 27, 2019

(65) Prior Publication Data

US 2019/0195483 A1    Jun. 27, 2019

Related U.S. Application Data

(63) Continuation-in-part of application No. 16/242,634, filed on Jan. 8, 2019, now abandoned, and a continuation-in-part of application No. 15/691,151, filed on Aug. 30, 2017, now abandoned.

(60) Provisional application No. 62/678,348, filed on May 31, 2018, provisional application No. 62/614,732, filed on Jan. 8, 2018, provisional application No. 62/381,348, filed on Aug. 30, 2016.

(51) Int. Cl.
| | |
|---|---|
| *F21V 27/00* | (2006.01) |
| *F21V 27/02* | (2006.01) |
| *F21V 23/00* | (2015.01) |
| *F21V 15/01* | (2006.01) |
| *F21V 21/116* | (2006.01) |

(52) U.S. Cl.
CPC .............. *F21V 27/02* (2013.01); *F21V 15/01* (2013.01); *F21V 21/116* (2013.01); *F21V 23/002* (2013.01); *F21V 27/00* (2013.01); *Y02B 20/42* (2013.01); *Y02B 20/445* (2013.01)

(58) Field of Classification Search
CPC . B65H 2701/34; B65H 75/4471; F21V 27/00; F21V 27/02; F21V 23/002; A47G 2033/0827; F21S 4/10
See application file for complete search history.

(56) References Cited

U.S. PATENT DOCUMENTS

| | | | | |
|---|---|---|---|---|
| 2,141,909 | A | * 12/1938 | Hauser | ............... B65H 75/4449 |
| | | | | 191/12.2 R |
| D286,134 | S | 10/1986 | Schwartz | |
| 4,773,623 | A | 9/1988 | Nabinger | |
| D310,207 | S | 8/1990 | Sheps | |
| 5,690,198 | A | * 11/1997 | Lohr | ...................... H02G 11/02 |
| | | | | 191/12.2 R |

(Continued)

OTHER PUBLICATIONS

Evacuumstore; Electrolux Plastic Canister Cord Winder Assembly.
(Continued)

*Primary Examiner* — Vibol Tan
(74) *Attorney, Agent, or Firm* — William D. Popejoy

(57) ABSTRACT

A light source with integrated cable management system that retracts and extends the cables. The lighting system has a housing, a multi-line cable reel, and a light source. The multi-line cable reel is a rotatable mechanism that allows the cables to be retracted and extended into the housing. The multi-line cable reel has a winding mechanism, and at least one cable. The winding mechanism is concentrically mounted into the housing, and the plurality of cables are rotatably mounted around the winding mechanism. Thus, allowing for the length of the plurality of cables to be adjusted according to the needs of installation.

13 Claims, 12 Drawing Sheets

(56) References Cited

U.S. PATENT DOCUMENTS

| | | | | |
|---|---|---|---|---|
| 6,491,413 B1* | 12/2002 | Benesohn | ............... | F21S 8/02 |
| | | | | 362/294 |
| D527,038 S | 8/2006 | Eskew | | |
| 7,264,478 B1* | 9/2007 | Downing | ............ | B65H 75/425 |
| | | | | 191/12.4 |
| 7,441,924 B1* | 10/2008 | Thames | ............... | F21V 27/00 |
| | | | | 362/258 |
| 7,931,389 B2* | 4/2011 | Suckle | ............... | B65H 75/403 |
| | | | | 242/400 |
| 9,490,659 B1* | 11/2016 | English | ............... | H02J 7/355 |
| 9,777,895 B2* | 10/2017 | Bokun | ............... | A47G 33/08 |
| 10,041,639 B1* | 8/2018 | Thompson | ............ | F21S 8/035 |
| 2011/0197794 A1* | 8/2011 | Nunes | ............... | B65H 75/36 |
| | | | | 108/50.02 |
| 2018/0218855 A1 | 8/2018 | Lange et al. | | |

OTHER PUBLICATIONS

Native Union; Eclipse—Say Goodbye to Messy Cables.
Aqlightinggroup; Dimmable LED Puck Light—120V Under Cabinet Lighting.

* cited by examiner

LIGHT SOURCE WITH INTEGRATED CABLE MANAGEMENT SYSTEM

The current application claims a priority to the U.S. Provisional Patent application Ser. No. 62/678,348 filed on May 31, 2018.

FIELD OF THE INVENTION

The present invention relates generally to lighting systems. More specifically, the present invention is a light source with an integrated cable management system, that allows users to retract or extend the necessary length of cable to power the light source.

BACKGROUND OF THE INVENTION

Modern life relies on numerous sources of energy ranging from fossil fuels to electricity. Electricity is used in various application, however one of the most popular application of electrical power is illumination. Modern households rely on electrical power for a variety of appliances, however one of the earliest uses for electricity was for illumination. Various types of lights are available for use, each with unique features, however most lights rely on a form of electrical power for functionality. Electricity is generally transported through wired networks or through battery packs. Most household appliances are powered via the internal circuit of the building, and as a result they require cables or circuitry for functionality. While the building's internal circuitry is usually hidden behind walls, numerous household appliances are equipped with attached cords designed to be plugged into household outlets.

Most buildings have integrated internal lights, however additional lights may be added depending on user requirements. The installation of additional lights varies depending on location or purpose. In some cases, more than one light source is necessary, however interconnecting multiple lights may prove to be a challenging task due to the numerous elongated cables that may not be aesthetically pleasing. As an example, in some cases users may choose to install lights underneath cabinets or furniture. The present invention aims to solve some of the problems mentioned above by disclosing a light with an integrated cable reel, that allows users to retract only the necessary length of cable needed for installation.

DETAIL DESCRIPTIONS OF THE INVENTION

Figure 1:
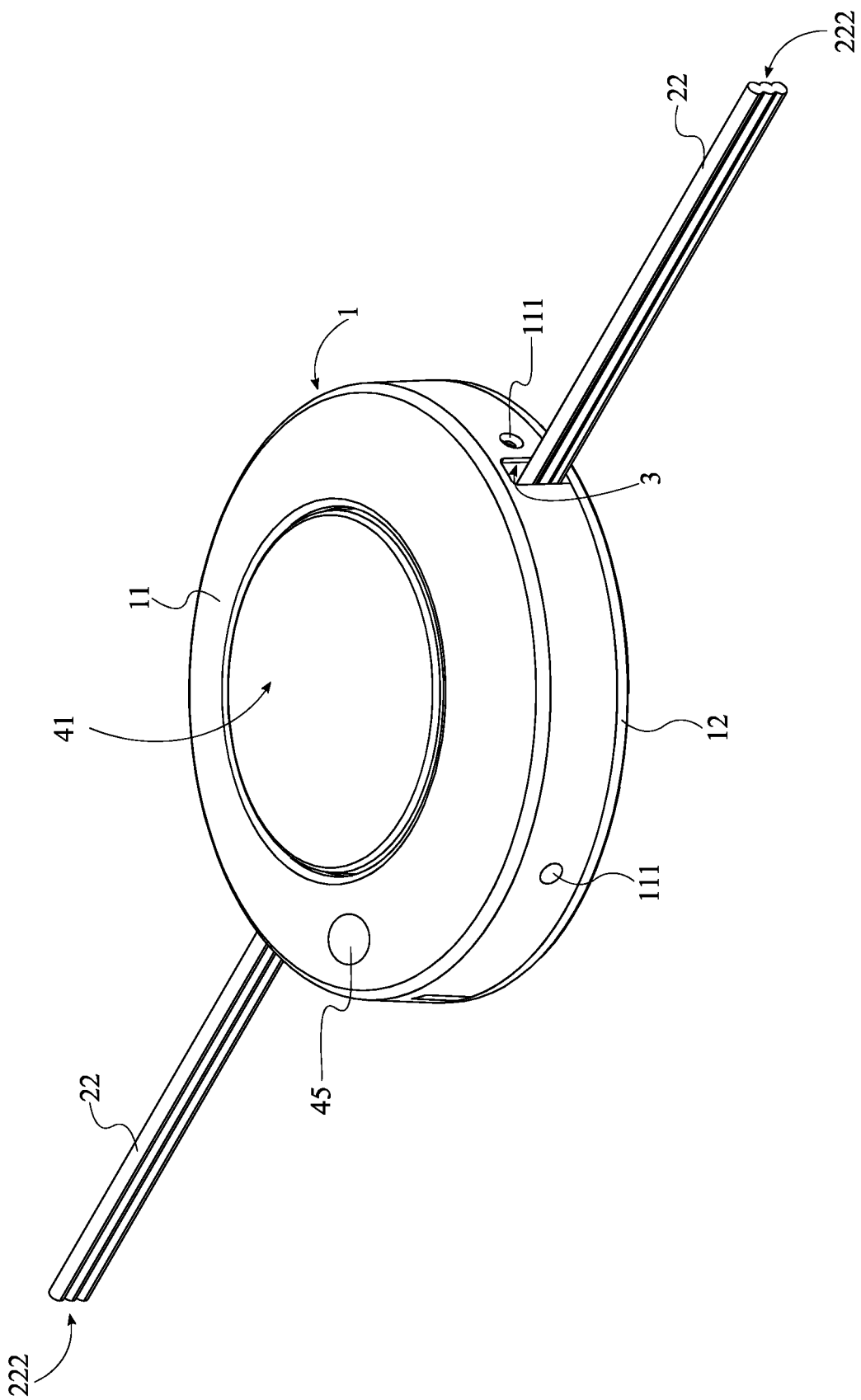
FIG. 1 is an isometric perspective view of the present invention.

All illustrations of the drawings are for the purpose of describing selected versions of the present invention and are not intended to limit the scope of the present invention.

In reference to FIG. 1 to FIG. 11, the present invention, a light source with an integrated cable management system, is a device that enables a user to extend or retract a group of wires needed to operate a light. To accomplish this, the present invention employs a retracting mechanism integrated into an assembly. The retracting mechanism is encapsulated into a case, allowing the group of electrical lines to be extended or retracted depending on the necessary length for operation. To achieve the above-described functionalities, the present invention comprises a housing 1, a multi-line cable reel 2, at least one guide channel 3, a light source 4, and a plurality of housing fasteners 5. The housing 1, is an enclosure designed to encapsulate the aforementioned components of the present invention. The multi-line cable reel 2 rotates freely, winding or unwinding the group of wires. Additionally, the at least one guide channel 3 enables the cables of the multi-line cable reel 2 to slide into or out of the housing 1, while preventing any potential kinks which may occur during operation. The multi-line cable reel 2 comprises a winding mechanism 21 and at least one cable 22. The winding mechanism 21 enables the multi-line cable reel 2 to pay out or reel in a length of cable 22, as directed by the user. That is, the winding mechanism 21 controls the retraction and extension of the wires in and out of the housing 1 through the plurality of guide channels 3. The winding mechanism 21 is rotatably mounted within an interior compartment 18 of the housing 1. Therefore, the present invention maintains an overall compact design. The light source 4 illuminates the surrounding area with various degrees of intensity depending on the preference of the user.

Figure 8:
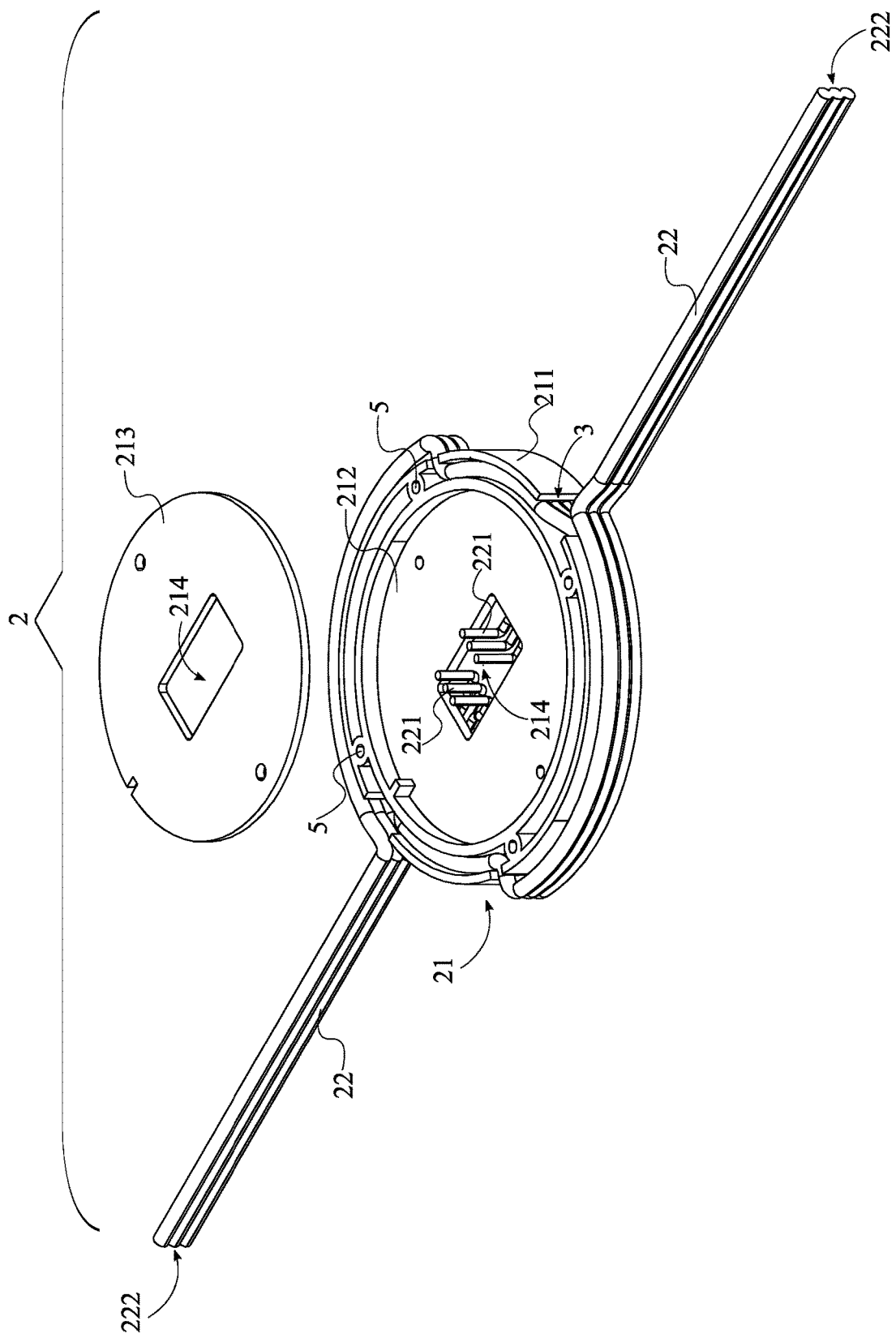
FIG. 8 is a bottom perspective view of the present invention, which shows the cover.

In reference to FIG. 8, a first end 221 of the cable 22 is tethered to the winding mechanism 21. Consequently, the cable 22 is secured to the multi-line cable reel 2, preventing the possibility of the user accidentally separating the cable 22 from the present invention, altogether. Additionally, the cable 22 is electrically connected to the light source 4. Thus connected, electrical power from an external source can be delivered to the light source 4 through the cable 22. The at least one guide channel 3 traverses into the interior compartment 18, through the housing 1. Additionally, the cable 22 traverses through the guide channel 3. Accordingly, the guide channel 3 provides an opening through which the cable 22 are pulled out or reeled into the housing 1. The light source 4 is integrated into a first face 16 of the housing 1. As a result, the generated light is directed away from the housing 1 and into the external environment. The plurality of housing fasteners 5 is adjacently connected to a second face 17 of the housing 1, opposite to the light source 4. Consequently, the housing 1 may be secured to various objects or surfaces while the light source 4 is retained in an orientation that facilitates illuminating the external environment. The cable 22 and the light source 4 are electrically connected. Therefore, the light source 4 may be powered using a variety of power sources. The present invention offers flexibility of installation for the user by enhancing the adjustability of the cable 22.

Figure 2:
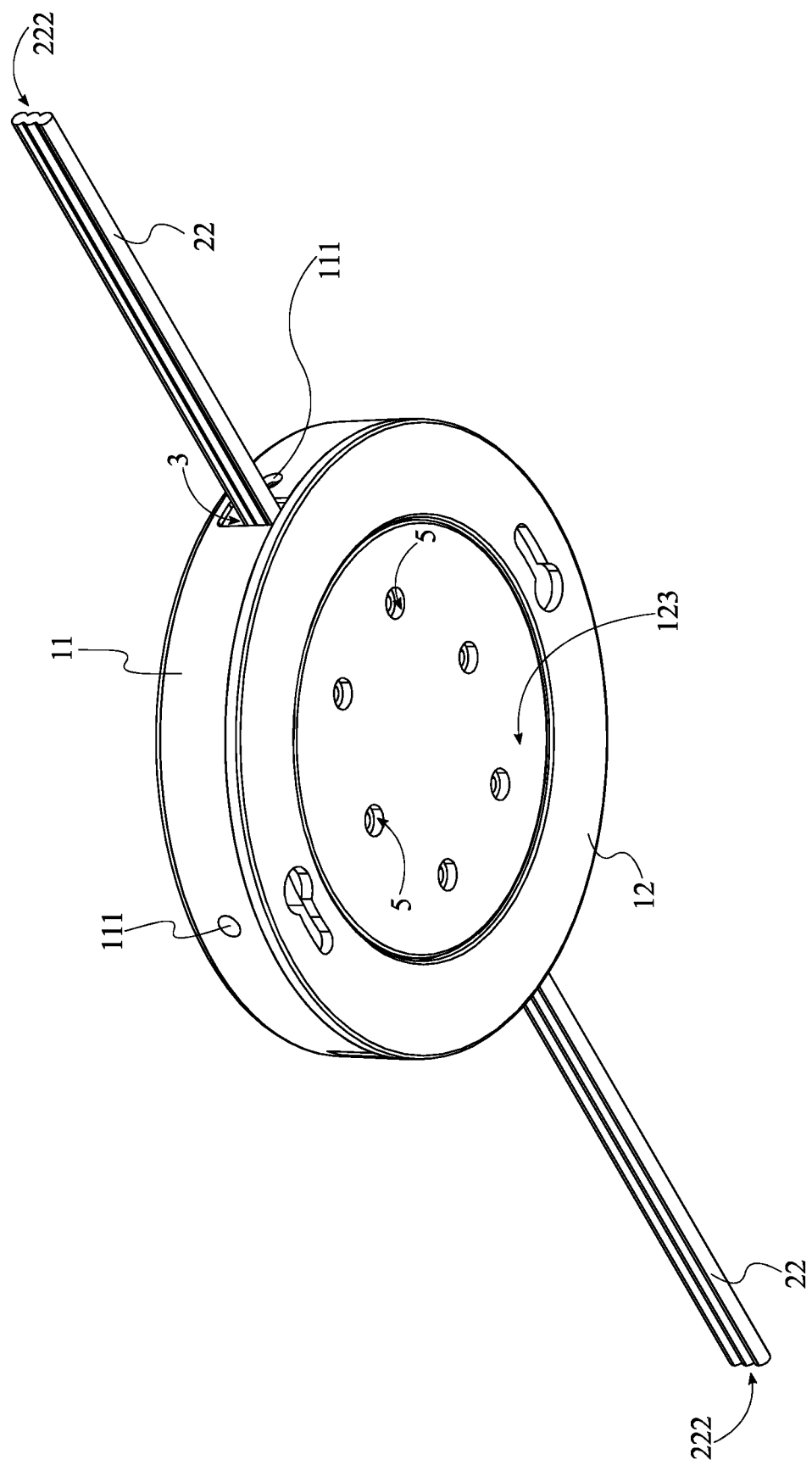
FIG. 2 is a bottom perspective view of the present invention.
Figure 3:
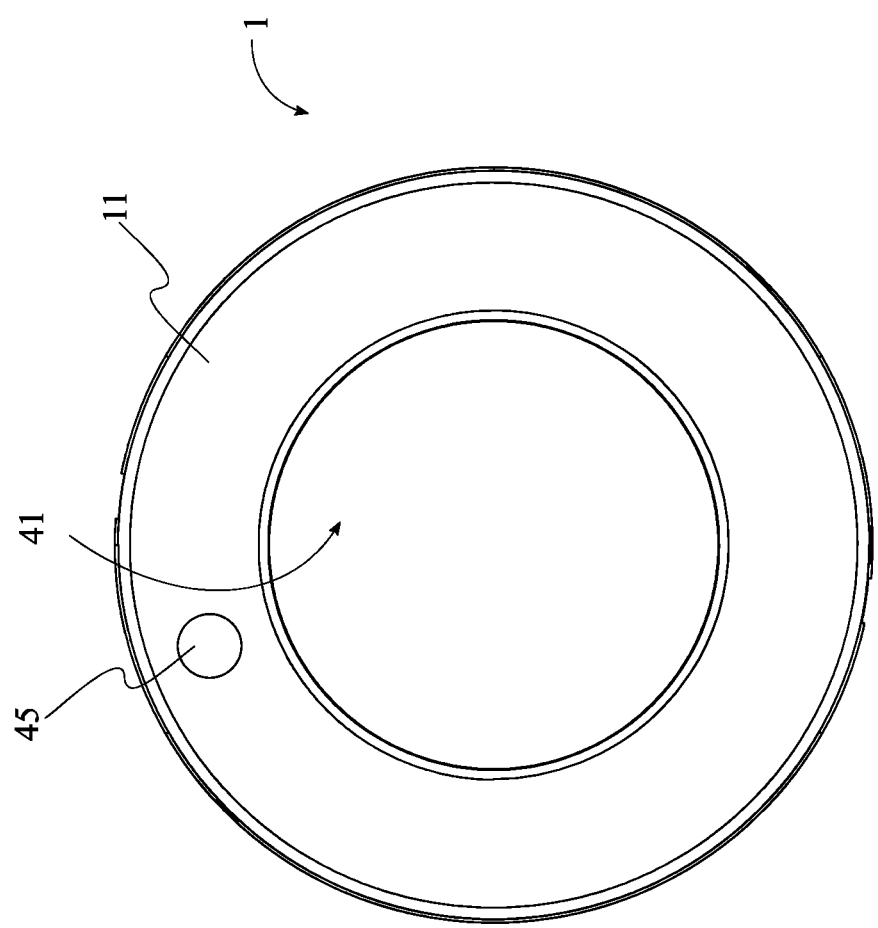
FIG. 3 is a top view of the present invention, which shows the lid.
Figure 4:
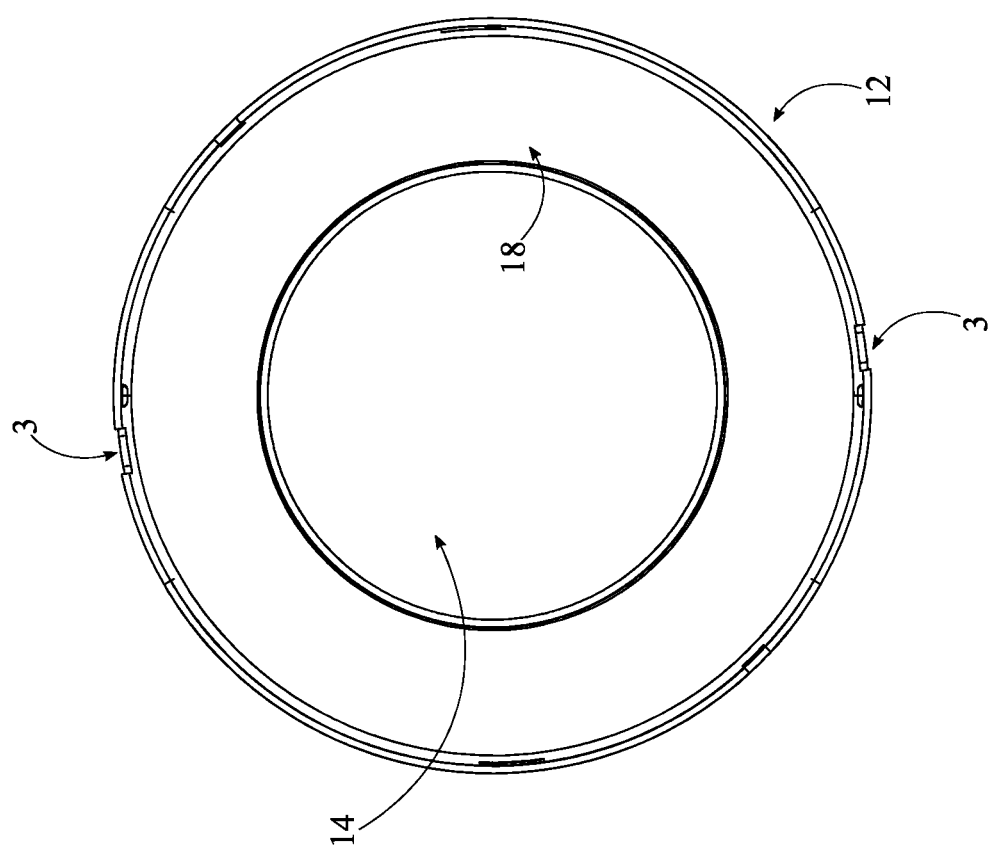
FIG. 4 is a left-side view of the present invention, which shows the receptacle.
Figure 5:
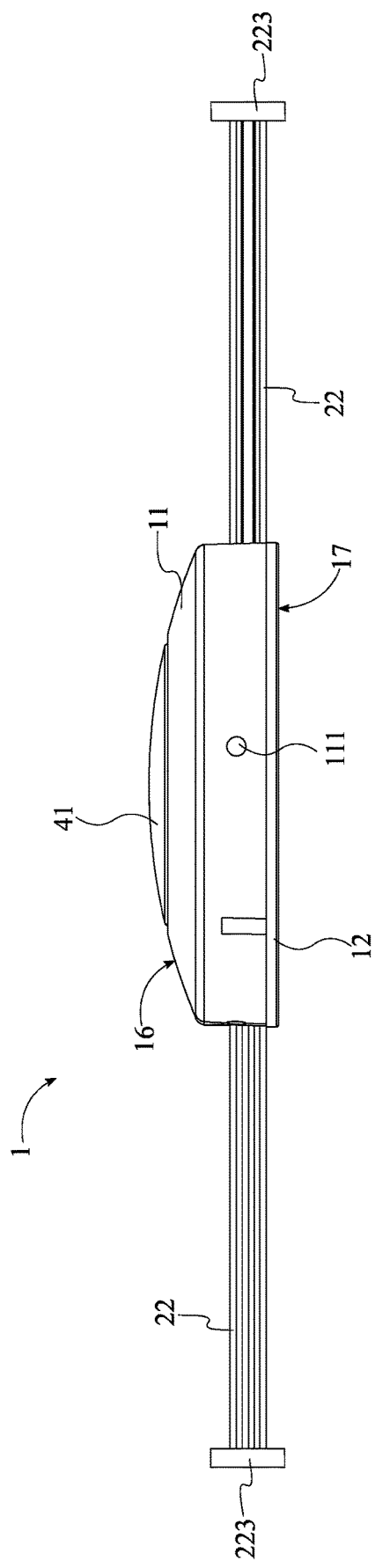
FIG. 5 is a front view of the present invention.
Figure 6:
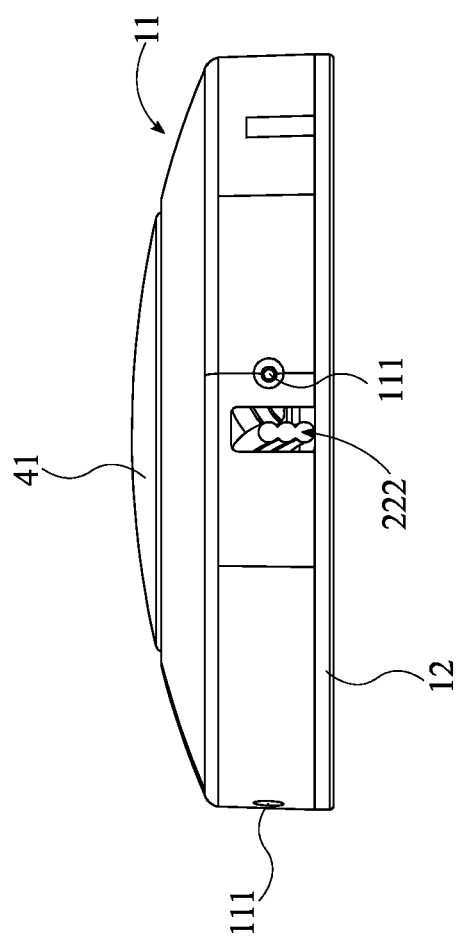
FIG. 6 is a right view of the present invention.
Figure 7:
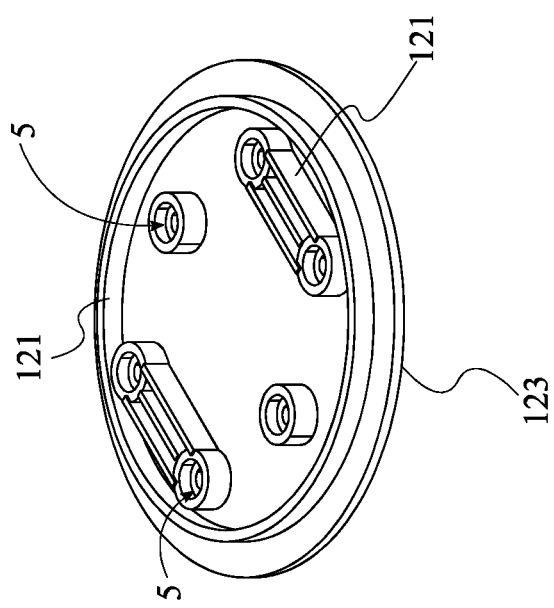
FIG. 7 is a top perspective view of the present invention, which shows the cover.

In reference to FIGS. 1-2, the housing 1, comprises a lid 11, a receptacle 12, and an output hole 13. The lid 11 is designed to function as a protective cover that shields the components stored within the housing 1, without hindering the beam of light that is generated by the present invention. As a result, the lid 11 isolated the components of the present invention from hazards generated by external environment including but not limited to, water and physical hazards.

Various types of fastening mechanisms may be used to mount the lid 11 over the receptacle 12 including but not limited to, interlocking pin and slot connectors, snaps, clamps, and magnetic couplers. The interior compartment 18 is delineated by the lid 11 and the receptacle 12. As a result, the components of the present invention are stored within. The output hole 13 transverses through the lid 11 into the interior compartment 18. The output hole 13 is oriented normal to the second surface. As a result, the output hole 13 acts as an aperture through which the beam of light produced by the light source 4 passes when shining into the external environment. Additionally, the light source 4 transcends from the interior compartment 18 through the output hole 13. Furthermore, the access hole 14 transverses through the lid 11 into the interior compartment.

In an alternative embodiment, a plurality of engagement pins 111 is radially distributed around the lid 11. Additionally, in this embodiment a plurality of engagement slots 122 is distributed around the receptacle 12, such that a corresponding pin from the plurality of engagement pins 111 engages into each of the plurality of engagement slots 122. This configuration enables the lid 11 to be separated from the receptacle 12 by twisting. Thus, decoupling the plurality of engagement pins 111 from the plurality of engagement slots 122, and enabling the lid 11 to be separated from the receptacle 12.

Figure 12:
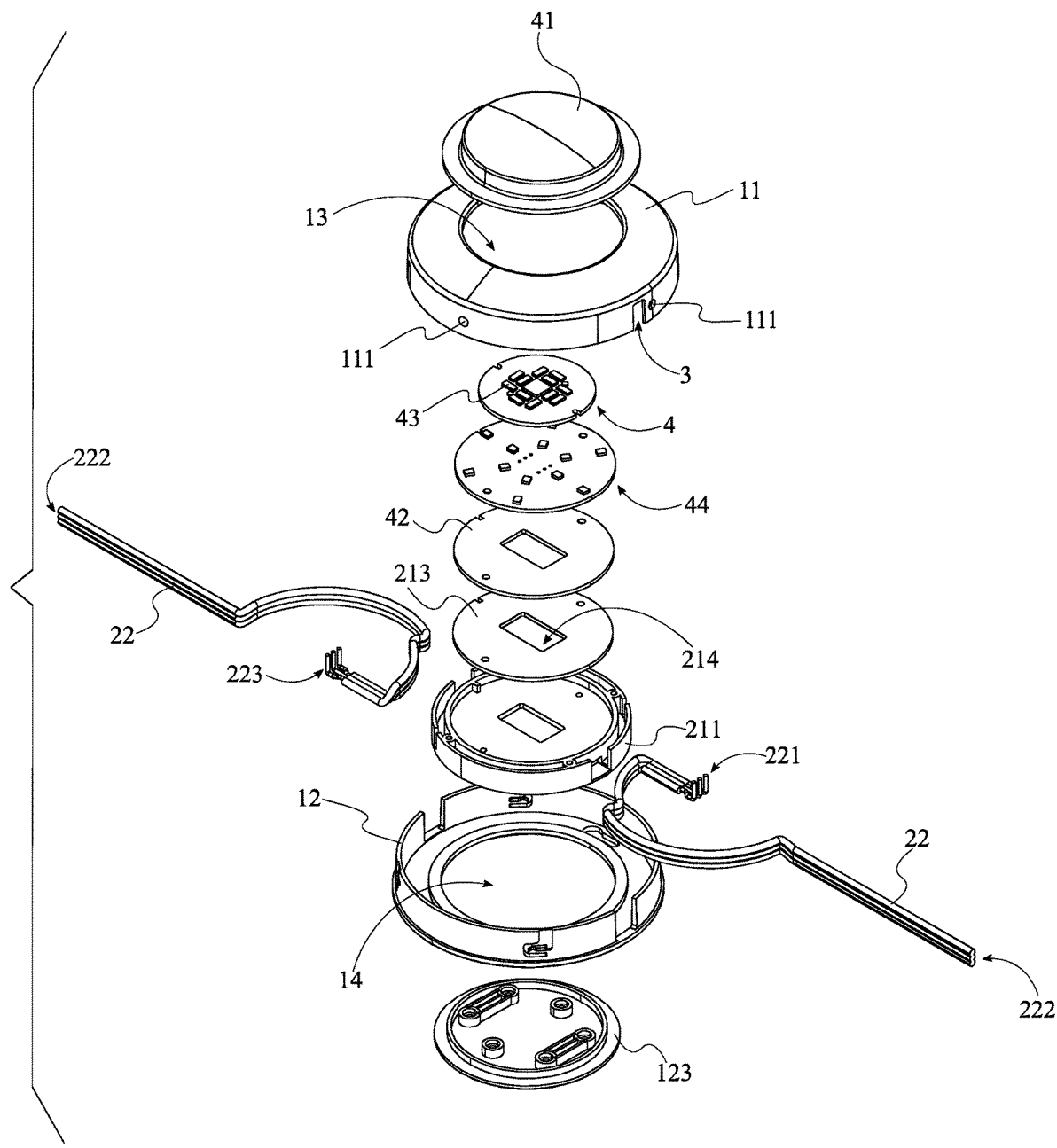
FIG. 12 is an exploded perspective view of the present invention.

The present invention is designed to provide the possibility of interconnecting a plurality of light sources 4 with integrated cable management systems. The light source 4 comprises a lens 41, a mounting plate 42 213, and at least one lamp 43. The lens 41 is mounted onto the reel 211, as referenced in FIG. 12. Additionally, the lens 41 is concentrically aligned to the output hole 13. As a result, the lens 41 is maintained in an orientation that facilitates dispersing the beam of light generated by the lamp 43, into the area around where the present invention is installed. Various types of lenses 41 may be used in the light source 4, without departing from the scope of the invention. Depending on the shape and size of the lens 41 numerous characteristics of the beam of light including, but not limited to, focus, wavelength, and intensity may be adjusted depending on user preference. The mounting plate 42 is mounted onto the multi-line cable reel 2. The lamp 43 is mounted onto the mounting plate 42, opposite to the multi-line cable reel 2. As a result, the light source 4 maintains the lamp 43 in an orientation that facilitates illuminating the external environment. Furthermore, a second end 222 of the cable 22 allows for the addition of a male or female interconnect, each of the plurality of interconnects is terminally fastened to a corresponding cable 22. Depending to the type of connection used, the user is able to link multiple units of the present invention, by connecting the second end 222 from an arbitrary unit, to a corresponding cable end of an arbitrary unit.

In reference to FIG. 1 and FIG. 2, the housing 1 further comprises an access hole 14, a support lip 15, a first face 16, and a second face 17. The output hole 13 and the access hole 14 are concentrically aligned. The access hole 14 transverses through the receptacle 12 into the interior compartment. Additionally, the access hole 14 is oriented normal to the second face 17. Accordingly, the user is able to access the light source 4 and other components stored within the housing 1 through the access hole. The support lip 15 is perimetrically mounted around the access hole 14. Additionally, the support lip 15 is positioned in between the winding mechanism 21 and the receptacle 12. Thus positioned, the support lip 15 functions as a mounting ring that enables components to be rotatably mounted onto the receptacle 12.

The multi-line cable reel 2 further comprises an annular support groove 23. In reference to FIGS. 9-10, the annular support groove 23 is concentrically aligned with the support lip 15 Additionally the multi-line cable reel 2 is rotatably mounted into the receptacle 12. As a result, the winding mechanism 21 is able to spin in both clockwise and counterclockwise directions about a central axis when paying out or reeling in lengths of the cable 22. As the winding mechanism 21 rotates, the cable 22 is retracted into the housing 1 via the multi-line cable reel 2. The direction of rotation of the multi-line cable reel 2 may be adapted depending on user need and direction of installation. By encapsulating the winding mechanism 21 within the housing 1, the multi-line cable reel 2 is protected from external elements which may hinder the correct operation of the present invention. To facilitate this, the annual support groove 23 transverses into the winding mechanism 21. Additionally, the annular support groove 23 is concentrically aligned to the support lip 15. Furthermore, the support lip 15 engages the annular support groove 23. Consequently, the support lip 15 and the annular support groove 23 function as a rotatable mounting system that enables the multi-line cable reel 2 to rotate while being retained in a desired orientation within the housing 1. Multiple units of the present invention may be daisy-chained in a configuration chosen by the user, operating simultaneously, or being individually controlled. The first end 221 is connected to the winding mechanism 21, and the second end 222 of a corresponding cable from an arbitrary unit may be connected to the second end 222 of a selected cable 2 from an adjacent unit. The plurality of cables 22 are electrically interconnected to each other. Furthermore, since most electrical cables are flexible, the positioning and arrangement of the present invention is arbitrary to the user. The present invention may be configured in an arrangement specifically designated to direct the light source 4, in an area where additional illumination may be required.

Figure 9:
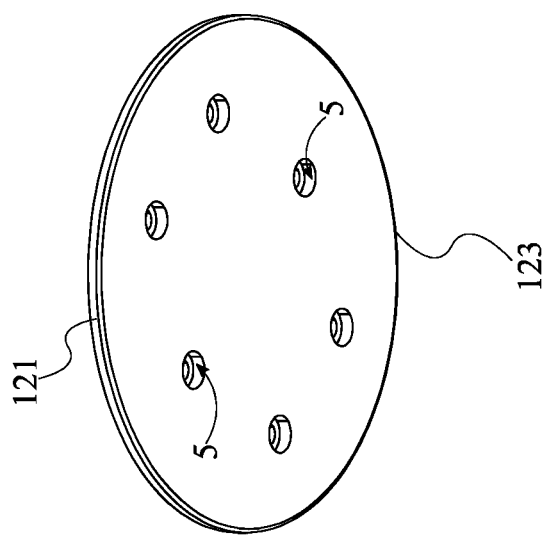
FIG. 9 is a perspective exploded view of the present invention, which shows the multi-line cable reel
Figure 10:
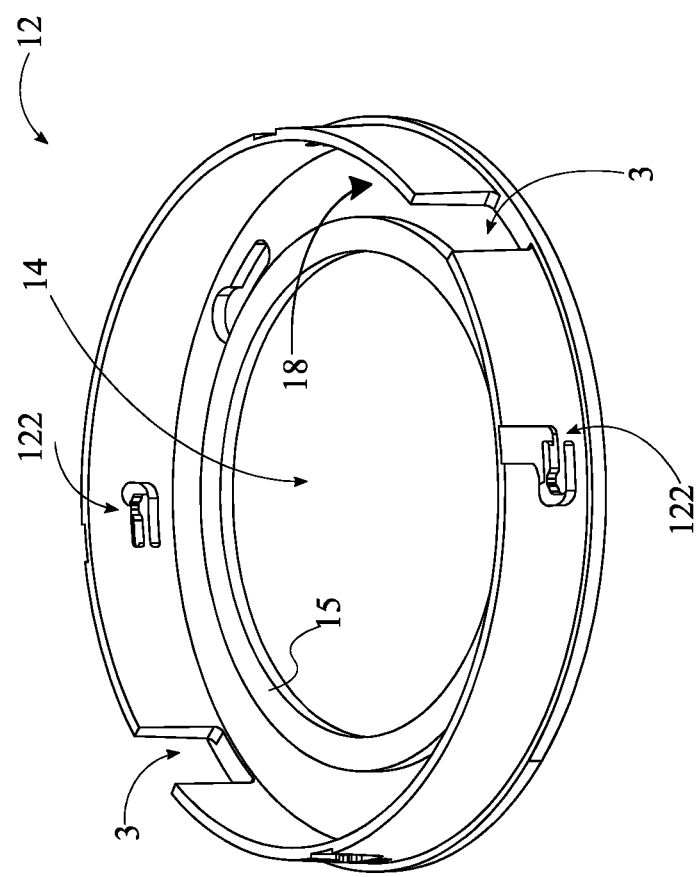
FIG. 10 is an isometric perspective view of the present invention, which shows the receptacle.
Figure 11:
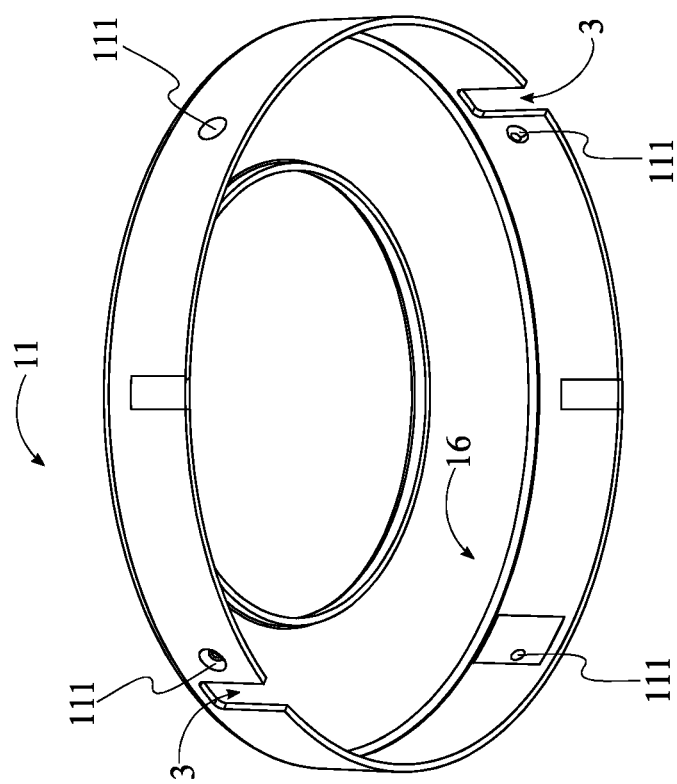
FIG. 11 is a bottom perspective view of the present invention, which shows the lid.

In reference to FIGS. 9-10, the at least one guide channel 3 is at least a plurality of guide channels 3. The plurality of guide channels 3 is laterally distributed around the receptacle 12. As a result, each guide channel 3 forms a passage way through which a corresponding cable 22 can be threaded. That is, preferably the present invention is designed with the at least one cable 22 being a plurality of cables 22. As such, the corresponding cable 22 is passed through one of the pluralities of guide channels 3 when being played out or reeled in by the winding mechanism 21.

The present invention is designed with a winding mechanism 21 that can be rotated independently of the components within the surrounding housing 1. To that end, the winding mechanism 21 comprises a reel 211, a lamp recess 212, at least one spacer plate 213, and an aperture 214. Additionally, the reel 211 is rotatably mounted within the housing 1. Preferably, the user is able to rotate the winding mechanism 21 by rotating the lens 41. To facilitate this, the lamp recess 212 transverses into the reel 211 and is countersunk into the winding mechanism 21. Specifically, the lamp recess 212 is oriented from the first face 16 toward the second face 17. Additionally, the spacer plate 213 is mounted within the lamp recess 212. Further, the mounting plate 42 is mounted onto the spacer plate 213, opposite to the reel 211. As a result, rotation of the lens 41 is transferred to the winding mechanism 21 and used to pay out or reel in lengths of the cable 22. In alternative embodiments, the user is able to rotate the winding mechanism 21 by rotating the housing 1. In these embodiments, the mounting plate is rotatably mounted onto the spacer plate 213 and the reel 211 is fixedly mounted to the receptacle 12. The first end 221 of the cable 22 is tethered to the reel 211. Consequently, the plurality of cables 22 is secured to the winding mechanism 21. As a result, when the cable 22 is extended fully, the cable 22 remains attached to the present invention.

The present invention is designed to enable a user to repair or replace the components within the housing 1. To that end, the winding mechanism 21 further comprises an aperture 214. Additionally, the housing 1 further comprises an inner lip 121, and a cover 123. The aperture 214 traverses through the reel 211 and the spacer plate 213. The aperture 214 is concentrically aligned to the lamp recess 212. Furthermore, the reel 211 rotates onto the spacer plate 213. Consequently, the aperture 214, provides access to the lamp recess 212. The first end 221 of the cable 22 traverses through the access hole 14. Additionally, the first end 221 of the cable 22 transverses through the aperture 214, providing guidance as the cable 22 is being extended or retracted into the winding mechanism 21. As a result, the reel 211 retracts the cable 22 into the interior compartment 18 of the housing 1, by rotating the cable 22 around the perimeter of the reel 211. The cover 123 is mounted to the receptacle 12, and concentrically aligned with the access hole 14. The cover 123 protects the underside of the housing 1, further expanding the versatility of the present invention by providing additional surface for various fastening mechanisms to be attached. Additionally, the cover 123 is removably fastened to the access hole 14.

In reference to FIG. 8, the light source 4 further comprises a control module 44 and a switch 45. The control module 44 is mounted within the housing 1. More specifically, the control module 44 enhances the functionality of the present invention, by allowing the user to adjust the operations of the lamp 43 or remotely control the present invention. As an example, the control module 44 allows the user to operate the present invention, readjust the intensity of the light source 4. Furthermore, the control module 44 is positioned between the plurality of spacer plates 213, and the lens 41. In reference to FIG. 12, the cable 22 further comprises a plurality of electrical interconnects 223. Additionally, the at least one cable 22 is preferably a plurality of cables 22. Each of the plurality of electrical interconnects 223 is terminally connected to a corresponding cable from the plurality of cables 22. As a result, a chain-like embodiment may be constructed, when one unit of the present invention is tethered to an adjacent or arbitrary unit. Each of the plurality of electrical interconnects 223 is connected adjacent to a second end 222 of the corresponding cable 22, opposite to the winding mechanism 21. Each of the plurality of electrical interconnects 223 is electrically connected to the corresponding cable 2. Therefore, the switch 45 and the circuit board 46 are electrically interconnected. The switch 45 may further accomplish a combination of functions, including but not limited to powering the present invention, and dimming the intensity of the light source 4. Various types of switches may be used in the present invention including but not limited to mechanical switches, electrical switches or pressure switches. Furthermore, the design and location of the switch is subject in accordance to user necessities. The switch 45 is electrically connected to the light source 4. As an example, in the preferred embodiment, the switch 45 is integrated into the light source 4, allowing the user to control the present invention by simply pressing directly onto the lens 41.

Although the invention has been explained in relation to its preferred embodiment, it is to be understood that many other possible modifications and variations can be made without departing from the spirit and scope of the invention as hereinafter claimed.

What is claimed is:

1. A light source with an integrated cable management system comprising:
    a housing;
    a multi-line cable reel;
    at least one guide channel;
    a light source;
    a plurality of housing fasteners;
    the multi-line cable reel comprising a winding mechanism and at least one cable;
    the winding mechanism being rotatably mounted within an interior compartment of the housing;
    a first end of the cable being tethered to the winding mechanism;
    the at least one guide channel traversing into the interior compartment, through the housing;
    the cable traversing through the guide channel;
    the light source being integrated into a first face of the housing;
    the plurality of housing fasteners being adjacently connected to a second face of the housing, opposite to the light source;
    the cable being electrically connected to the light source;
    the housing comprising a lid, a receptacle, and an output hole;
    the lid being mounted over the receptacle;
    the interior compartment being delineated by the lid and the receptacle;
    the output hole traversing through the lid into the interior compartment;
    the output hole being oriented normal to the second face;
    the light source further comprising a lens, a mounting plate, and at least one lamp;
    the lens being mounted onto the lid;
    the lens being concentrically aligned to the output hole;
    the mounting plate being mounted onto the multi-line cable reel; and
    the at least one lamp being mounted onto the mounting plate, opposite to the multi-line cable reel.

2. A light source with an integrated cable management comprising:
    a housing;
    a multi-line cable reel;
    at least one guide channel;
    a light source;
    a plurality of housing fasteners;
    the multi-line cable reel comprising a winding mechanism and at least one cable;
    the winding mechanism being rotatably mounted within an interior compartment of the housing;
    a first end of the cable being tethered to the winding mechanism;
    the at least one guide channel traversing into the interior compartment, through the housing;
    the cable traversing through the guide channel;

the light source being integrated into a first face of the housing;
the plurality of housing fasteners being adjacently connected to a second face of the housing, opposite to the light source;
the cable being electrically connected to the light source;
the housing further comprising an access hole and a support lip;
the multi-line cable reel further comprising an annular support groove;
the access hole traversing through the receptacle into the interior compartment;
the access hole being oriented normal to the second face;
the support lip being perimetrically mounted around the access hole;
the support lip being positioned in between the winding mechanism and the receptacle;
the annular support groove traversing into the winding mechanism;
the annular support groove being concentrically aligned to the support lip; and
the support lip engaging into the annular support groove.

3. A light source with an integrated cable management system comprising:
a housing;
a multi-line cable reel;
at least one guide channel;
a light source;
a plurality of housing fasteners;
the multi-line cable reel comprising a winding mechanism and at least one cable;
the winding mechanism being rotatably mounted within an interior compartment of the housing;
a first end of the cable being tethered to the winding mechanism;
the at least one guide channel traversing into the interior compartment, through the housing;
the cable traversing through the guide channel;
the light source being integrated into a first face of the housing;
the plurality of housing fasteners being adjacently connected to a second face of the housing, opposite to the light source;
the cable being electrically connected to the light source;
the housing comprising a lid, a receptacle, and an output hole;
the lid being mounted over the receptacle;
the interior compartment being delineated by the lid and the receptacle;
the output hole traversing through the lid into the interior compartment;
the output hole being oriented normal to the second face;
the at least one guide channel being a plurality of guide channels; and
the plurality of guide channels being laterally distributed around the receptacle.

4. A light source with an integrated cable management system comprising:
a housing;
a multi-line cable reel;
at least one guide channel;
a light source;
a plurality of housing fasteners;
the multi-line cable reel comprising a winding mechanism and at least one cable;
the winding mechanism being rotatably mounted within an interior compartment of the housing;
a first end of the cable being tethered to the winding mechanism;
the at least one guide channel traversing into the interior compartment, through the housing;
the cable traversing through the guide channel;
the light source being integrated into a first face of the housing;
the plurality of housing fasteners being adjacently connected to a second face of the housing, opposite to the light source;
the cable being electrically connected to the light source;
the winding mechanism comprising a reel, a lamp recess, and at least one spacer plate;
the light source comprising a mounting plate;
the lamp recess traversing into the reel;
the lamp recess being oriented from the first face toward the second face;
the spacer plate being mounted within the lamp recess;
the mounting plate being mounted onto the spacer plate, opposite to the reel; and
the first end of the cable being tethered to the reel.

5. The light source with an integrated cable management system as claimed in claim 4 comprising:
the winding mechanism further comprising an aperture;
the aperture traversing through the reel and the at least one spacer plate;
the aperture being concentrically aligned to the lamp recess; and
the first end of the cable traversing through the aperture.

6. The light source with an integrated cable management system as claimed in claim 4 comprising:
the reel being rotatably mounted within the housing.

7. A light source with an integrated cable management system comprising:
a housing;
a multi-line cable reel;
at least one guide channel;
a light source;
a plurality of housing fasteners;
the multi-line cable reel comprising a winding mechanism and at least one cable;
the winding mechanism being rotatably mounted within an interior compartment of the housing;
a first end of the cable being tethered to the winding mechanism;
the at least one guide channel traversing into the interior compartment, through the housing;
the cable traversing through the guide channel;
the light source being integrated into a first face of the housing;
the plurality of housing fasteners being adjacently connected to a second face of the housing, opposite to the light source;
the cable being electrically connected to the light source;
a plurality of electrical interconnects;
the at least one cable being a plurality of cables;
each of the plurality of electrical interconnects being terminally connected to a corresponding cable from the plurality of cables;
each of the plurality of electrical interconnects being connected adjacent to a second end to the corresponding cable, opposite to the winding mechanism; and
each of the plurality of electrical interconnects being electrically connected to the corresponding cable.

8. The light source with an integrated cable management system as claimed in claim 2 comprising:

the housing comprising a lid, a receptacle, and an output hole;
the lid being mounted over the receptacle;
the interior compartment being delineated by the lid and the receptacle;
the output hole traversing through the lid into the interior compartment; and
the output hole being oriented normal to the second face.

9. The light source with an integrated cable management system as claimed in claim 4 comprising:
the housing comprising a lid, a receptacle, and an output hole;
the lid being mounted over the receptacle;
the interior compartment being delineated by the lid and the receptacle;
the output hole traversing through the lid into the interior compartment; and
the output hole being oriented normal to the second face.

10. The light source with an integrated cable management system as claimed in claim 9 comprising:
the winding mechanism further comprising an aperture;
the aperture traversing through the reel and the at least one spacer plate;
the aperture being concentrically aligned to the lamp recess; and
the first end of the cable traversing through the aperture.

11. The light source with an integrated cable management system as claimed in claim 9 comprising:
the reel being rotatably mounted within the housing.

12. A light source with an integrated cable management system comprising:
a housing;
a multi-line cable reel;
at least one guide channel;
a light source;
a plurality of housing fasteners;
the multi-line cable reel comprising a winding mechanism and at least one cable;
the winding mechanism being rotatably mounted within an interior compartment of the housing;
a first end of the cable being tethered to the winding mechanism;
the at least one guide channel traversing into the interior compartment, through the housing;
the cable traversing through the guide channel;
the light source being integrated into a first face of the housing;
the plurality of housing fasteners being adjacently connected to a second face of the housing, opposite to the light source;
the cable being electrically connected to the light source;
the housing comprising a lid, a receptacle, and an output hole;
the lid being mounted over the receptacle;
the interior compartment being delineated by the lid and the receptacle;
the output hole traversing through the lid into the interior compartment;
the output hole being oriented normal to the second face;
a control module;
the control module being mounted within the housing; and
the control module being electronically connected to the light source.

13. The light source with an integrated cable management system as claimed in claim 7 comprising:
the housing comprising a lid, a receptacle, and an output hole;
the lid being mounted over the receptacle;
the interior compartment being delineated by the lid and the receptacle;
the output hole traversing through the lid into the interior compartment; and
the output hole being oriented normal to the second face.

* * * * *